United States Patent [19]
Saigo et al.

[11] Patent Number: 5,926,033
[45] Date of Patent: Jul. 20, 1999

[54] SURFACE LIGHT SOURCE PANEL FOR UNIFORM LUMINANCE

[75] Inventors: Takamitsu Saigo, Kobe; Teruo Taniguchi, Shiga; Masayoshi Hashioka, Shiga; Mitsuhiro Okamura, Kusatsu; Kenji Kimijima, Shiga, all of Japan

[73] Assignee: Starlite Company, Ltd., Osaka, Japan

[21] Appl. No.: 08/744,667

[22] Filed: Nov. 6, 1996

[30] Foreign Application Priority Data

Nov. 10, 1995 [JP] Japan ................................. 7-317205
Nov. 20, 1995 [JP] Japan ................................. 7-326561
Jan. 12, 1996 [JP] Japan ................................. 8-021811

[51] Int. Cl.$^6$ ............................. F21V 7/04; G01D 11/28
[52] U.S. Cl. ............................ 326/31; 362/31; 362/27; 362/26
[58] Field of Search ............................ 362/31, 27, 26

[56] References Cited

U.S. PATENT DOCUMENTS 5,408,388  4/1995  Kobayashi et al. .................. 362/31
5,575,549  11/1996  Ishikawa et al. .................... 362/31
5,709,447  1/1998  Murakami et al. .................. 362/31

FOREIGN PATENT DOCUMENTS 0675318  10/1995  European Pat. Off. .
2247309  2/1992  United Kingdom .
WO 94/20871  9/1994  WIPO .

OTHER PUBLICATIONS

European Patent Office Communication for European Patent Application 96117854.8–2205 dated Jun. 12, 1997.

*Primary Examiner*—Sandra O'Shea
*Assistant Examiner*—Ronald E. DelGizzi
*Attorney, Agent, or Firm*—Armstrong, Westerman, Hattori, McLeland & Naughton

[57] ABSTRACT

A panel used for a surface light source device is constituted by a transparent substrate having high light transmission properties, the transparent substrate having an end surface on which light emitted from a light source is incident, a reflecting surface for reflecting the incident light, and a light emitting surface for emitting the incident light. The end surface on which the light is incident may be formed in a concave-convex shape in the direction of its end side.

12 Claims, 7 Drawing Sheets

SURFACE LIGHT SOURCE PANEL FOR UNIFORM LUMINANCE

BACKGROUND OF THE INVENTION

1. Field of the Invention

The present invention relates generally to a panel used for various types of surface light source devices such as a back light for a liquid crystal display, a display board, and a lighting display, and more particularly, to a panel for emitting light from the whole of a light emitting surface upon incidence of light emitted from a light source on a transparent substrate from an end surface of the transparent substrate and reflection of the incident light from a reflecting surface.

2. Description of the Prior Art

In various types of surface light source devices such as a back light for a liquid crystal display, a display board and a lighting display, a panel constituted by a transparent substrate having high light transmission properties is used in order that light is emitted from the entire surface of the surface light source device.

In thus emitting light from the surface light source device using the panel, a light source 1 such as a cold-cathode tube is provided in close proximity to an end surface 11a of the panel constituted by a transparent substrate 10 having high light transmission properties such as an acrylic board, and a light reflector 1a is provided around the light source 1, as shown in FIG. 1, so that light emitted from the light source 1 is introduced into the transparent substrate 10 from the end surface 11a. Although a case where the light source 1 is provided in close proximity to the end surface 11a of the transparent substrate 10 is only illustrated in FIG. 1, light sources may, in some cases, be respectively provided in close proximity to opposite end surfaces on both sides of the transparent substrate 10.

In emitting from a light emitting surface 12 the light introduced into the transparent substrate 10, the remaining end surface 11b, which is not in close proximity to the light source 1, of the transparent substrate 10 and a reflecting surface 13 on the opposite side of the light emitting surface 12 are respectively provided with reflection sheets 2, and the light introduced into the transparent substrate 10 is introduced into the light emitting surface 12 upon being reflected by the reflection sheets 2 so that the light is emitted from the whole of the light emitting surface 12.

In recent years, the following panels have been developed in order that light having uniform luminance is emitted from the whole of the light emitting surface 12 of the panel: a panel so constructed that irregular reflecting portions 13a in a circular shape for irregularly reflecting light are so provided on the reflecting surface 13 that the farther the irregular reflecting portion 13a is away from a light source 1, the larger the area thereof is, and a plurality of rows of irregular reflecting portions 13a are formed, as shown in FIG. 2, a panel so constructed that an irregular reflecting portion 13a is formed on the whole of the reflecting surface 13, as shown in FIG. 3, and a panel so constructed that a translucent diffusion sheet 3 is formed on the light emitting surface 12 for emitting light, and the light emitted from the light emitting surface 12 is made uniform upon being dispersed by the dispersion sheet 3, as shown in FIG. 1.

When the light emitted from the light source 1 is introduced into the transparent substrate 10 from the end surface 11a which is in close proximity to the light source 1, and the light is emitted from the light emitting surface 12 of the transparent substrate 10 in the above-mentioned manner, several bright lines called luminescent lines appear in the vicinity of the end surface 11a of the transparent substrate 10, generally in a position spaced approximately 5 to 10 millimeters apart from the end surface 11a and a position further spaced several millimeters apart from the position, and the luminance in portions on both sides in the direction of the end side of the end surface 11a is lower than that in the other portion.

When the panel is used for a surface light source device such as a back light of a liquid crystal display, therefore, there are some problems. For example, the display of images such as characters becomes unclear due to the luminescent lines. Further, the portions on both sides in the vicinity of the end surface 11a, which is in close proximity to the light source 1, of the transparent substrate 10 become dark, whereby the images such as characters become indistinct to read.

Furthermore, when irregular reflecting portions 13a in a circular shape are provided on the reflecting surface 13, as shown in FIG. 2, the reflecting states of the light in the irregular reflecting portions 13a and the other portion significantly differ. Therefore, the luminance of the light emitted from the light emitting surface 12 differs between the irregular reflecting portions 13a and the other portion, whereby a difference in brightness arises, and the irregular reflecting portions 13a are seen as if the pattern thereof was raised. On the other hand, when an irregular reflecting portion 13a is provided on the whole of the reflecting surface 13, as shown in FIG. 3, the irregular reflection of the light in the irregular reflecting portion 13a varies, whereby a subtle difference in brightness partially arises. Particularly when the thickness of the transparent substrate 10 used for the panel is small, the irregular reflecting portions 13a are significantly seen as if the pattern thereof was raised, or a difference in brightness significantly arises even when the translucent diffusion sheet 3 is provided on the light emitting surface 12 to diffuse the emitted light, whereby the images such as characters become indistinct to read.

In providing the reflection sheets 2 on the remaining end surfaces 11b, which are not in close proximity to the light source 1, of the transparent substrate 10 and the reflecting surface 13 as described above, the reflection sheets 2 have been conventionally affixed to the surfaces. However, work for affixing the reflection sheets 2 is very laborious and takes a lot of time. Further, the reflection sheets 2 are not satisfactorily affixed to the surfaces. The reflection sheets 2 are stripped from the surfaces by themselves while the panel is being used, whereby there are some problems. For example, the light leaks out of portions where the reflection sheets 2 are stripped, whereby the light introduced into the whole of the light emitting surface 12 is decreased. Further, the light is not reflected from the portions where the reflection sheets 2 are stripped, whereby the luminance in the portions is significantly made lower than that in the other portion.

SUMMARY OF THE INVENTION

An object of the present invention is to solve, in a panel used for various types of surface light source devices such as a back light for a liquid crystal display, a display board, and a lighting display, the above-mentioned various problems in a case where light emitted from a light source is introduced into a transparent substrate through an end surface, which is in close proximity to the light source, of the transparent substrate, and the light is emitted from a light emitting surface of the transparent substrate.

A first object of the present invention is to prevent, when a panel is used for a surface light source device such as a back light of a liquid crystal display, reading of images such as characters in the surface light source device from being indistinct by emitting uniform light from the whole of a light emitting surface of the panel.

Another object of the present invention is to prevent, when light emitted from a light source is introduced into a transparent substrate from an end surface, which is in close proximity to the light source, of the transparent substrate, and the light is emitted from a light emitting surface of the transparent substrate, several bright lines called luminescent lines from appearing in the vicinity of the end surface which is in close proximity to the light source as well as to prevent the luminance in portions on both sides in the direction of the end side of the end surface from being made lower than that in the other portion.

Still another object of the present invention is to prevent, when a reflecting surface of a panel used for a surface light source device is provided with an irregular reflecting portion, the irregular reflecting portion from being seen as if the pattern thereof was raised and to prevent a subtle difference in brightness from partially arising.

A further object of the present invention is to make it possible to simply reflect light incident on a panel used for a surface light source device from an end surface other than an end surface to which a light source is provided in close proximity and a reflecting surface as well as to make it possible to stably reflect the light from the surfaces.

A first panel used for a surface light source device according to the present invention is constituted by a transparent substrate having high light transmission properties, the transparent substrate having an end surface on which light emitted from a light source is incident, a reflecting surface for reflecting the incident light, and a light emitting surface for emitting the incident light, the end surface on which the light is incident being formed in a concavo-convex shape in the direction of its end side.

When the end surface, to which the light source is provided in close proximity, of the transparent substrate is formed in a concave-convex shape in the direction of the end side, as in the first panel, the light emitted from the light source is incident on the transparent substrate from the end surface formed in a concave-convex shape upon being dispersed in various directions. As a result, bright lines called luminescent lines are prevented from being produced in the vicinity of the end surface, which is in close proximity to the light source, of the transparent substrate, and the luminance in portions on both sides in the direction of the end side of the end surface is hardly made lower than that in the other portion, whereby light having uniform luminance is emitted from the whole of the light emitting surface.

A second panel used for a surface light source device according to the present invention is constituted by a transparent substrate having high light transmission properties, the transparent substrate having an end surface on which light emitted from a light source is incident, a reflecting surface for reflecting the incident light, a light emitting surface for emitting the incident light, the reflecting surface being provided with an irregular reflecting portion for irregularly reflecting the light, the light emitting surface being provided with projections in a fine and smooth shape and/or recesses in a fine and smooth shape.

In a case where the reflecting surface for reflecting the incident light is provided with the irregular reflecting portion, and the light emitting surface for emitting the incident light is provided with the projections and the recesses in a fine and smooth shape, when the light irregularly reflected from the irregular reflecting portion is introduced into the light emitting surface, the light is emitted upon being dispersed in various directions in the projections and the recesses in a fine and smooth shape provided on the light emitting surface. As a result, even when the thickness of the transparent substrate constituting the surface light surface panel is decreased, a difference in brightness between the irregular reflecting portion and the other portion on the reflecting surface becomes unclear, whereby the possibility that the irregular reflecting portion is seen as if the pattern thereof was raised as in the conventional example is eliminated, and a difference in brightness is prevented from partially arising in a case where the irregular reflecting portion is provided on the whole of the reflecting surface. Therefore, the light having uniform luminance is emitted from the whole of the light emitting surface.

A third panel used for a surface light source device according to the present invention is constituted by a transparent substrate having high light transmission properties, the transparent substrate having an end surface on which light emitted from a light source is incident, a reflecting surface for reflecting the incident light, and a light emitting surface for emitting the incident light, a reflecting member composed of resin having light reflecting properties being integrally formed on the transparent substrate in such a manner as to be in contact with an end surface other than the end surface on which the light is incident.

When the reflecting member composed of resin having light reflecting properties is integrally formed on the transparent substrate composed of resin having light transmission properties in such a manner as to be in contact with the end surface other than the end surface, to which the light source is provided in close proximity, of the transparent substrate, as in the third panel, the necessity of performing such laborious work that the reflection sheets are affixed to the end surface other than the end surface which is in close proximity to the light source as in the conventional example is eliminated, and the possibility that the reflecting sheets are stripped by themselves so that the light is not reflected is eliminated. Therefore, the light incident on the transparent substrate from the light source is introduced into the light emitting surface upon being reliably reflected by the reflecting member, whereby the light is efficiently emitted from the whole of the light emitting surface.

The foregoing and other objects, features, aspects and advantages of the present invention will become more apparent from the following detailed description of the present invention when taken in conjunction with the accompanying drawings.

PREFERRED EMBODIMENTS OF THE PRESENT INVENTION

Embodiments of panels for surface light source devices according to the present invention will be specifically described on the basis of attached drawings.

(Embodiment 1)

In a panel used for a surface light source device according to an embodiment 1, examples of a transparent substrate include one composed of a material having good light transmission properties such as acrylic resin or polycarbonate resin.

In forming an end surface, to which a light source is provided in close proximity, of a transparent substrate in a concave-convex shape in the direction of its end side in the panel, the end surface can be formed in a zigzag shape, a waveform shape, and a serrated shape, for example.

In fabricating a panel used for a surface light source device in which an end surface, to which a light source is provided in close proximity, of a transparent substrate is formed in a concave-convex shape in the direction of its end side as described above, when an end surface of a molding surface of a die used for forming the panel is formed in a concave-convex shape in such a manner as to correspond to projections and recesses provided on the end surface of the transparent substrate, and the end surface is formed in a concave-convex shape simultaneously with the formation of the panel, the panel can be simply fabricated.

Figure 4:
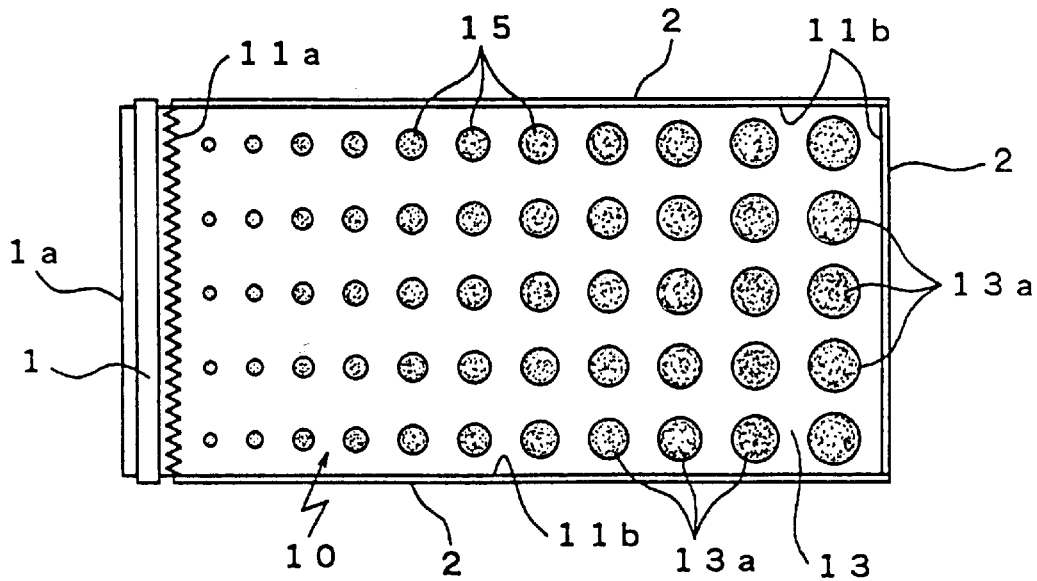
FIG. 4 is a schematic illustration of a surface light source device using a panel according to an embodiment 1 having recesses and projections in a zigzag shape provided on its end surface on which light is incident.

In the panel according to the present embodiment, an end surface 11a, to which a light source 1 such as cold-cathode tube is provided in close proximity, of a transparent substrate 10 is formed in a concave-convex shape which is a zigzag shape in the direction of its end side, as shown in FIG. 4.

Figure 5:
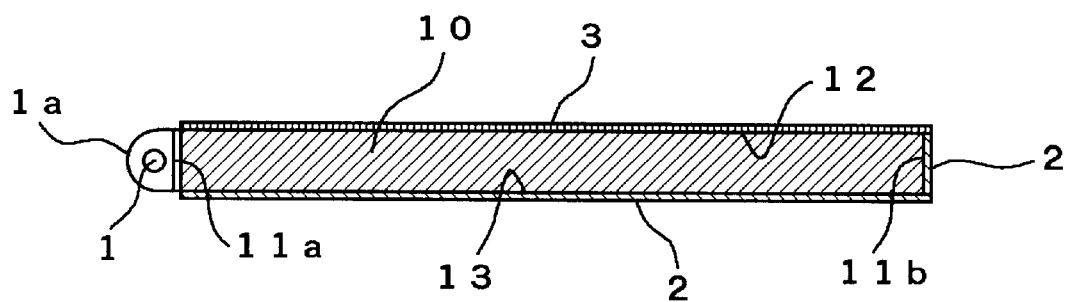
FIG. 5 is schematic cross-sectional view of a surface light source device using a panel according to the embodiment 1 having recesses and projections in a zigzag shape provided on its end surface on which light is incident.
Figure 6:
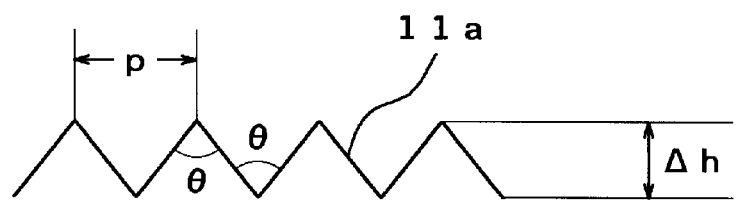
FIG. 6 is a partial illustration showing the state of the zigzag formed on the end surface on which light is incident in the panel according to the embodiment 1.

The light source 1 is provided in close proximity to the one end surface 11a of the transparent substrate 10 formed in a concave-convex shape, and a light reflector 1a is provided around the light source 1, as shown in FIG. 5, so that light emitted from the light source 1 is introduced into the transparent substrate 10 from the end surface 11a formed in a zigzag shape in the direction of the end side as described above.

In the panel, in emitting from a light emitting surface 12 the light introduced into the transparent substrate 10 as described above, end surfaces 11b excluding the end surface 11a formed in a concave-convex shape as described above and a reflecting surface 13 on the opposite side of the light emitting surface 12 for emitting the light are respectively provided with reflection sheets 2 so that the light introduced into the transparent substrate 10 is reflected by the reflection sheets 2.

Figure 3:
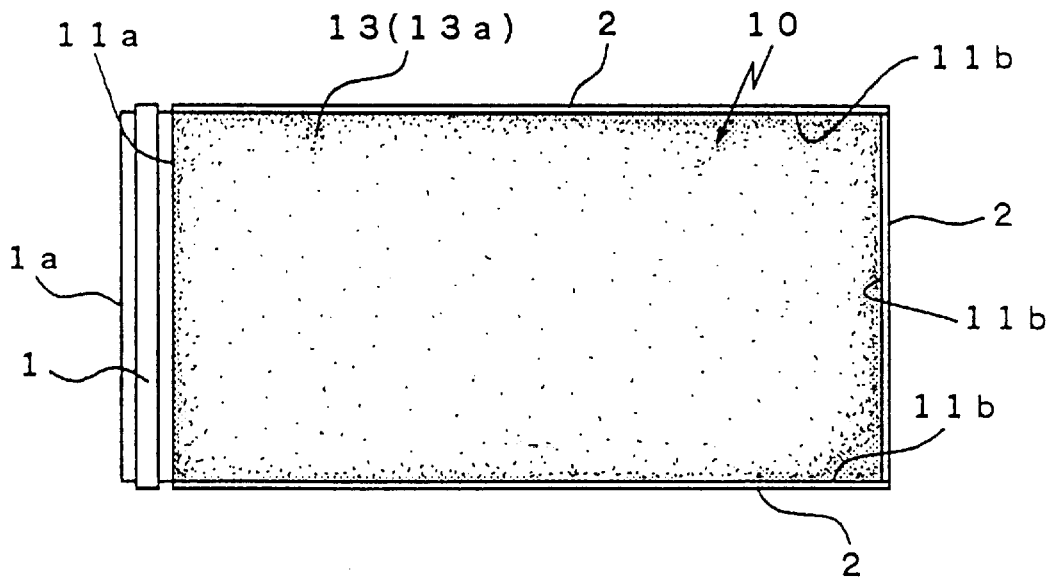
FIG. 3 is a schematic illustration showing a state where a panel having an irregular reflecting portion formed on the whole of its reflecting surface is used for a surface light source device.

Furthermore, in the panel, irregular reflecting portions 13a in a circular shape for irregularly reflecting the light are so formed that the farther the irregular reflecting portion 13a is apart from the light source 1, the larger the area thereof is, and a plurality of rows of irregular reflecting portions 13a are provided, as shown in FIG. 4. The light introduced into the transparent substrate 10 is irregularly reflected by the irregular reflecting portions 13a. In providing the irregular reflecting portions 13a, the irregular reflecting portion 13a can be provided by applying a white paint to the reflecting surface 13, and subjecting the reflecting surface 13 to fine concavo-convex processing, for example. Further, an irregular reflecting portion 13a can be formed on the whole of the reflecting surface 13, as shown in FIG. 3.

Additionally, in the panel, the light emitting surface 12 is provided with a translucent diffusion sheet 3, so that the emitted light is made uniform upon being diffused by the diffusion sheet 3.

When the light emitted from the light source 1 provided in close proximity to the one end surface 11a of the transparent substrate 10 formed in a concave-convex shape as described above is introduced into the transparent substrate 10 using the panel according to the present embodiment, the light is incident on the transparent substrate 10 upon being diffused in various directions on the end surface 11a formed in a concave-convex shape.

The light thus incident on the transparent substrate 10 upon being diffused in various directions is introduced into the light emitting surface 12 upon being reflected from the irregular reflecting portions 13a and portions of the reflection sheets 2, so that the light is emitted from the light emitting surface 12 through the diffusion sheet 3.

As a result, bright lines called luminescent lines are not produced in the vicinity of the end surface 11a, which is in close proximity to the light source 1, of the transparent substrate 10, and the luminance in portions on both sides in the vicinity of the end surface 11a of the transparent substrate 10 is not made low, whereby light having uniform luminance is emitted from the whole of the light emitting surface 12.

Figure 1:
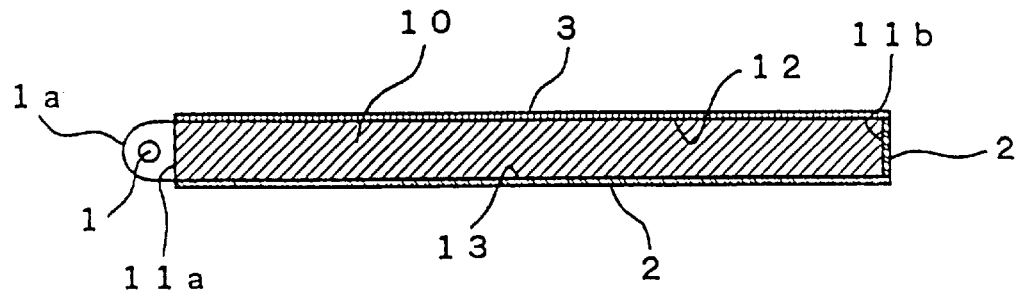
FIG. 1 is a schematic cross-sectional view of a surface light source device using a conventional panel.
Figure 2:
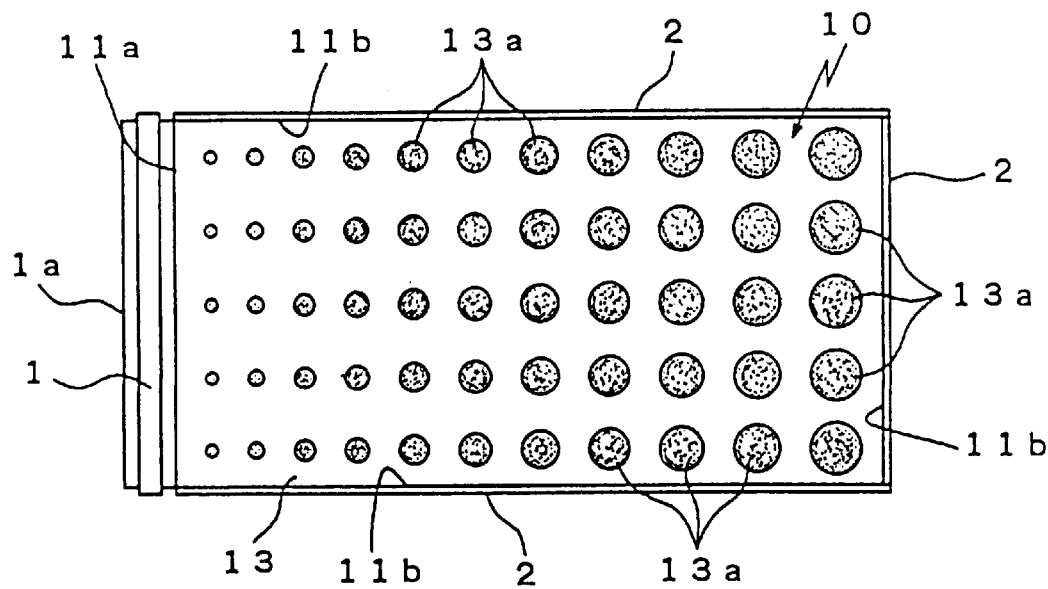
FIG. 2 is a schematic illustration showing a state where a panel having a plurality of rows of irregular reflecting portions in a circular shape formed on its reflecting surface is used for a surface light source device.

In then forming the end surface 11a, to which the light source 1 is provided in proximity, of the transparent substrate 10 in a zigzag shape in the direction of the end side, a panel used for a surface light source device according to the embodiment in which the pitch p between the crests of the zigzag is set to 2 mm, and the difference in height Δh between the crest and the trough of the zigzag is set to 1 mm, and a panel used for a surface light source device in a comparative example 1 in which the end surface 11a, to which the light source 1 is provided in close proximity, of the transparent substrate 10 is not formed in a zigzag shape but made flat, as shown in FIGS. 1 and 2 are used. Light is emitted to the panels 3 from the light source 1 under the same conditions, and the states of the light emitted from the respective light emitting surface 12 are examined.

In examining the states of the light emitted from the light emitting surfaces 12 of the panels in the embodiment and the comparative example, each of the light emitting surfaces 12 is divided into five equal divisions in the longitudinal and transverse directions to obtain 25 portions, and the luminance in the center of each of the portions is measured. The average value of the luminance measured in each of the portions (average luminance) is found, and the maximum luminance and the minimum luminance are measured in the portion. The ratio of the minimum luminance to the maximum luminance, i.e., the uniformity ratio (%)=(minimum value/maximum value)×100 is found. The results are shown in the following Table 1. Further, the presence or absence of luminescent lines in the vicinity of the end surface 11a, which is in close proximity to the light source 1, of the transparent substrate 10 is visually examined. The results are also shown in the following Table 1 by ○ indicating a case where the luminescent lines are not confirmed and x indicating a case where the luminescent lines are seen.

TABLE 1

|  | average luminance (cd/m²) | uniformity ratio (%) | presence or absence of luminescent lines |
|---|---|---|---|
| embodiment 1 | 3147 | 78 | ○ |
| comparative example 1 | 3012 | 64 | x |

As apparent from the results, in the panel in the embodiment 1 in which the end surface 11a, to which the light source 1 is provided in close proximity, of the transparent substrate 10 is formed in a zigzag shape in the direction of the end side, the average luminance and the uniformity ratio are improved, and no luminescent lines are produced in the vicinity of the end surface 11a of the transparent substrate 10, as compared with those in the panel in the comparative example in which the end surface 11a is made flat, whereby the entire light emitting surface 12 can be illuminated with light having uniform and sufficient brightness.

In the panel in the embodiment 1, in then forming the end surface 11a, to which the light source 1 is provided in close proximity, of the transparent substrate 10 in a zigzag shape in the direction of the end side, panels in experimental examples 1 to 3 in which the difference in height Δh between the crest and the trough of the zigzag and a point angle θ at the crest or the trough are changed are fabricated. Δh is set to 1 mm and θ is set to 90° in the experimental example 1, Δh is set to 0.5 mm and θ is set to 90° in the experimental example 2, and Δh is set to 0.5 mm and θ is set to 120° in the experimental example 3.

Using the panels in the experimental examples 1 to 3, the light emitting surface 12 of each of the panels is divided into nine equal divisions to obtain nine portions, light is irradiated onto the portions from the light source 1 under the same conditions. The luminance in the center of each of the portions of each of the light emitting surfaces 12 is measured, and the average luminance and the uniformity ratio in the portion are found in the above-mentioned manner. The results are shown in the following Table 2.

TABLE 2

|  | Δh (mm) | θ (°) | average luminance (cd/m²) | uniformity ratio (%) |
|---|---|---|---|---|
| experimental example 1 | 1.0 | 90 | 1897 | 93.4 |
| experimental example 2 | 0.5 | 90 | 1899 | 92.0 |
| experimental example 3 | 0.5 | 120 | 1935 | 92.0 |

As a result, in forming the end surface 11a of the transparent substrate 10 in a zigzag shape in the direction of the end side, the luminance of the light emitted from the light emitting surface 12 in the panel in the experimental example 3 in which the point angle θ is set to 120° is higher than that in each of the panels in the experimental examples 1 and 2 in which the point angle θ is set to 90°, whereby light having uniform and high luminance is emitted from the light emitting surface 12.

(Embodiment 2)

Also in a panel used for a surface light source device according to the present embodiment 2, examples of a transparent substrate 10 include one composed of a material having good light transmission properties such as acrylic resin or polycarbonate resin. Irregular reflecting portions 13a in a circular shape are so formed on a reflecting surface 13 of the transparent substrate 10 that the farther the irregular reflecting portion 13a is apart from a light source 1, the larger the area thereof is, and a plurality of rows of irregular reflecting portions 13a are provided, as in the above-mentioned embodiment 1.

Figure 7:
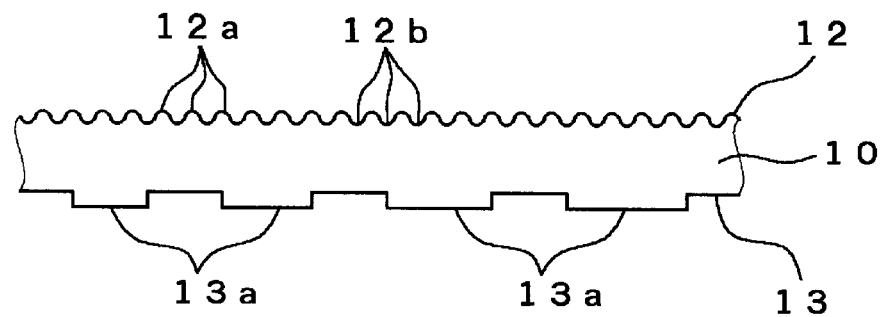
FIG. 7 is a partial illustration of a panel used for a surface light source device according to an embodiment 2 of the present invention.

In the panel, a lot of projections 12a and recesses 12b in a fine, rounded and smooth shape are provided on a light emitting surface 12 on the opposite side of the reflecting surface 13 on which the irregular reflecting portions 13a are provided, as shown in FIG. 7.

The reason why the projections 12a and the recesses 12b which are provided on the light emitting surface 12 are brought into a smooth shape is that if the projections 12a and the recesses 12b are not in a smooth shape, light introduced into the light emitting surface 12 is further reflected from the projections 12a and the recesses 12b, whereby only the luminance in a portion near the light source 1 is increased, and light having uniform luminance is not obtained on the whole of the light emitting surface 12.

In providing the light emitting surface 12 with the projections 12a and the recesses 12b in a smooth shape, it is preferable that the light emitting surface 12 is formed by respectively setting the maximum heights Rt and Rmax of a roughness curve and a profile curve which are defined in JIS B 0601 to not less than 0.4 μm and setting the average roughness at ten points which is also defined in JIS B 0601 in the profile curve to not less than 0.3 μm in order that the light introduced into the light emitting surface 12 is emitted upon being diffused in various directions by the projections 12a and the recesses 12b.

As a method of providing the light emitting surface 12 with a lot of projections 12a and recesses 12b in a fine and smooth shape, it is also possible to directly form the projections 12a and the recesses 12b on the light emitting surface 12 of the transparent substrate 10 by blasting or the like. When the light emitting surface 12 is directly subjected to blasting, however, the states of the projections 12a and the recesses 12b formed on each of transparent substrates 10 are not made constant, and each of the transparent substrates 10 must be subjected to blasting, whereby a lot of time and costs are required to mass-produce the panel.

Figure 8:
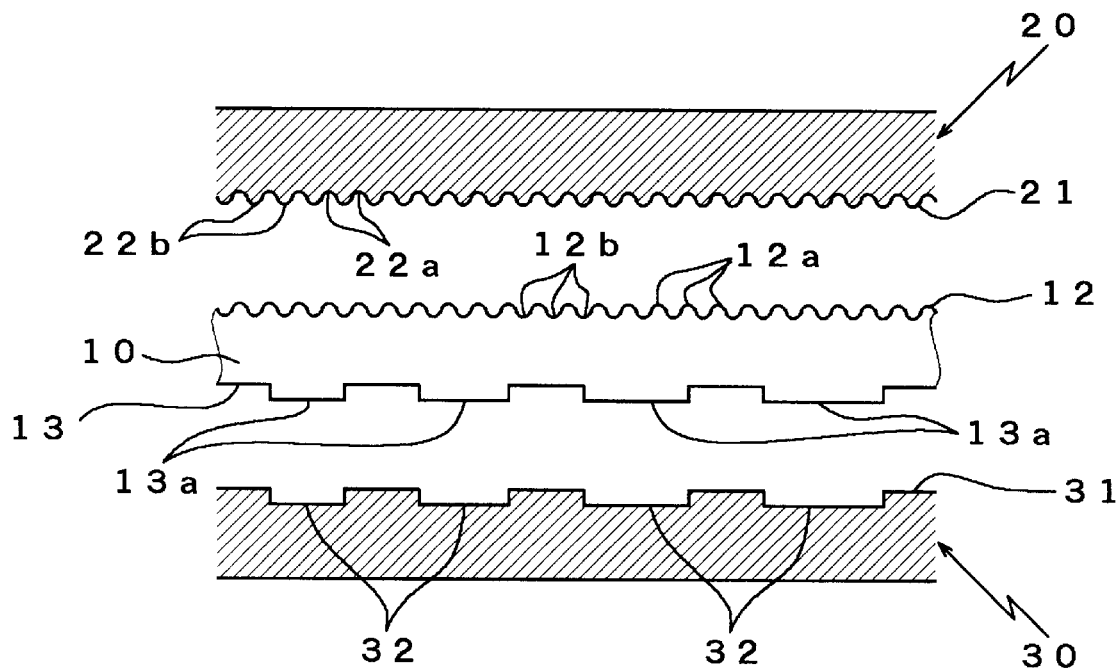
FIG. 8 is a partial illustration showing a state where the panel according to the embodiment 2 of the present invention is fabricated.

In providing the light emitting surface 12 with a lot of projections 12a and recesses 12b in a fine and smooth shape, therefore, it is preferable to drive a lot of spherical beads into a molding surface 21 of a die 20 for forming the light emitting surface 12 at high speed, provide a lot of recesses 22a and projections 22b in a smooth shape on the molding surface 21, and form projections 12a and recesses 12b in a fine and smooth shape on the light emitting surface 12 of the transparent substrate 10 using the die 20, as shown in FIG. 8, for example. Examples of the spherical beads driven into the molding surface 21 of the die 20 include a spherical member such as garnet, glass or silica.

In the present embodiment 2, in providing a lot of recesses 22a and projections 22b in a smooth shape on the molding surface 21 of the die 20 as described above, the spherical beads composed of garnet, glass or silica having a particle size of #240 to #3000 and preferably, having a particle size of #500 to #1000 are uniformly blasted at atmospheric pressures of 1 to 5 from distances of 100 to 500 mm.

On a molding surface 31 of the other die 30 paired with the mold 20, a plurality of rows of recesses 32 which have the shape of a circle having a depth of approximately 10 μm and have diameters successively increased are formed by photo-etching so as to correspond to the irregular reflecting portions 13a, as shown in FIG. 8.

The panel used for a surface light source device according to the present embodiment is fabricated by injection molding using the dies 20 and 30.

When the panel is thus fabricated, irregular reflecting portions 13a on the reflecting surface 13 of the panel and a lot of fine and smooth projections 12a and recesses 12b on the light emitting surface 12 are formed simultaneously with the fabrication of the panel, whereby the panel can be simply fabricated. A method of forming the irregular reflecting portions 13a on the reflecting surface 13 of the panel is not limited to the above-mentioned method. It is also possible to provide the irregular reflecting portions 13a by shot blasting, silk screen printing or the like on the reflecting surface 13 of the panel. Further, it is also possible to provide an irregular reflecting portion 13a on the whole of the reflecting surface 12, as shown in FIG. 3.

In emitting light from the light emitting surface 12 using the panel, the light source 1 is provided in close proximity to the one end surface 11a of the transparent substrate 10, and a light reflector 1a is provided around the light source 1, so that the light emitted from the light source 1 is introduced into the transparent substrate 10 from the end surface 11a, as in the conventional example shown in FIG. 1. Further, reflection sheets 2 are respectively provided on the remaining end surfaces 11b which are not in close proximity to the light source 1 and the reflecting surface 13 on which a lot of irregular reflecting portions 13a are provided, and a translucent diffusion sheet 3 is provided on the light emitting surface 12 on which the fine and smooth projections 12a and recesses 12b are found as described above.

When the light emitted from the light source 1 is incident on the panel through the end surface 11a of the transparent substrate 10, the light is introduced into the light emitting surface 12 upon being reflected from the irregular reflecting portions 13a, the reflection sheets 2, and the like. Further, the light thus introduced into the light emitting surface 12 is emitted upon being scattered in portions of the smooth projections 12a and recesses 12 provided on the light emitting surface 12, and the light thus scattered is diffused by the diffusion sheet 3.

As a result, light having uniform luminance is emitted from the whole of the light emitting surface 12 of the panel.

Even if the thickness of the transparent substrate 10 constituting the panel is decreased, the irregular reflecting portions 13a are not seen as if the pattern thereof was raised, and no difference in brightness partially arises.

The panel used for a surface light source device in the embodiment 2 and a panel used for a surface light source device in a comparative example 2 are then compared.

In fabricating each of the panels in the embodiment 2 and the comparative example 2, polymethyl methacrylate resin having high light transmission properties is used for a material composing the transparent substrate 10.

With respect to the pair of dies 20 and 30 used for injection molding the transparent substrate 10, the molding surfaces 21 and 31 of the dies 20 and 30 are respectively subjected to preprocessing, to bring the molding surfaces 21 and 31 into mirror surfaces.

In the embodiment 2, spherical garnet having a particle size of #800 is blasted at an atmospheric pressure of 2.5 from a distance of 200 mm at the molding surface 21 of the mold 20, to provide a lot of recesses 22a and projections 22b in a fine and smooth shape on the molding surface 21. On the other hand, in the comparative example 2, a molding surface which is brought into a mirror state is used as it is.

Furthermore, with respect to the other die 30, the recesses 32 in a circular shape which have a depth of approximately 10 μm and have diameters successively increased in the range of 0.3 to 0.85 mm are formed on the molding surface 31 by photo-etching.

The dies 20 and 30 are used, to fabricate the panels in the embodiment 2 and the comparative example 2 each having a length of 151 mm, having a width of 212.2 mm and having a thickness of 2.5 mm by an injection machine (TD-150 manufactured by Nishin Jushi Kogyo K.K.).

As a result, in the panel in the embodiment 2, a plurality of rows of irregular reflecting portions 13a in a circular shape which has diameters successively increased in the range of 0.3 mm to 0.85 mm are formed on the reflecting surface 13, and a lot of fine and smooth projections 12a and recesses 12b are formed on the light emitting surface 12. On the other hand, in the panel in the comparative example 2, a plurality of rows of irregular reflecting portions 13a similarly to those in the embodiment 2 are formed on the reflecting surface 13, while the light emitting surface 12 is flat.

In the panels in the embodiment 2 and the comparative example 2, a light source 1 in a cylindrical shape is arranged in close proximity to the end surface 11a of the transparent substrate 10 on the side of the irregular reflecting portions 13a having smaller diameters, and the light reflector 1a is provided around the light source 1 in a cylindrical shape. Reflection sheets 2 made of polyester are respectively provided on the end surfaces 11b excluding the end surface 11a which is in close proximity to the light source 1 and the reflecting surface 13 on which the irregular reflecting portions 13a are provided. Further, the light emitting surface 12 is provided with a translucent diffusion sheet 3 made of polyester for diffusing light to the light emitting surface 12.

With respect to the panels in the embodiment 2 and the comparative example 2, light is emitted from the light source 1, respectively, under the same conditions, and the light is incident on the respective panels, to compare the states of the light emitted from the light emitting surfaces 12 of the respective panels.

In comparing the states of the light emitted from the light emitting surfaces 12 of the panels in the embodiment 2 and the comparative example 2, each of the light emitting surfaces 12 is divided into three equal divisions in the longitudinal and transverse directions to obtain nine portions, and the luminance in the center of each of the portions is measured by a luminance meter (BM-7 manufactured by Topukon K.K.). The average luminance and the uniformity ratio in each of the panels are found, as in the above-mentioned embodiment 1. The results are shown in the following Table 3. Further, rise corresponding to the pattern of the irregular reflecting portions 13a and a difference in brightness are visually evaluated. The results are also shown in the following Table 3. With respect to the rise corresponding to the pattern of the irregular reflecting portions 13a, a case where the irregular reflecting portions 13a are not seen as if the pattern thereof was raised is indicated by ○, and a case where the irregular reflecting portions 13a are clearly seen as if the pattern thereof was raised is indicated by x. With respect to the difference in brightness, a case where the difference in brightness is not visually felt is indicated by ○, and a case where a subtle difference in brightness is seen is indicated by Δ.

TABLE 3

|  | average luminance (cd/m²) | uniformity ratio (%) | rise of pattern | difference in brightness |
|---|---|---|---|---|
| embodiment 2 | 303 | 80 | ○ | ○ |
| comparative example 1 | 310 | 82 | x | Δ |

As apparent from the results, the panel in the embodiment 2 in which the projections 12a and the recesses 12b in a fine and smooth shape are formed on the light emitting surface 12 is approximately the same in the average luminance as the panel in the comparative example 2 in which the projections 12a and the recesses 12b are not formed on the light emitting surface 12. Therefore, the rise corresponding to the pattern of the irregular reflecting portions 13a and the difference in brightness are prevented from arising, whereby light having uniform and sufficient brightness is emitted from the whole of the light emitting surface 12.

(Embodiment 3)

Figure 9:
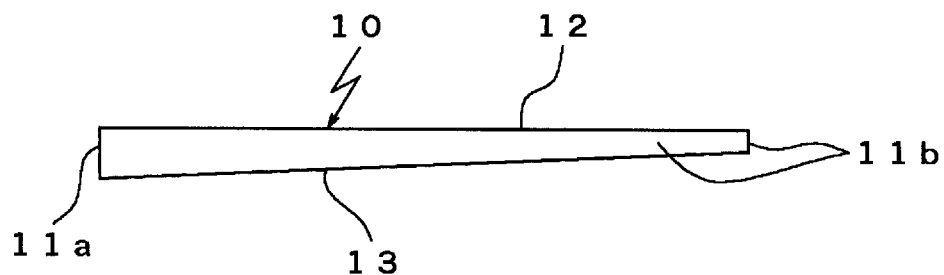
FIG. 9 consisting of FIG. 9A and FIG. 9B, is a front view and a plan view of a transparent substrate constituting a panel used for a surface light source device according to an embodiment 3 of the present invention.
Figure 9:
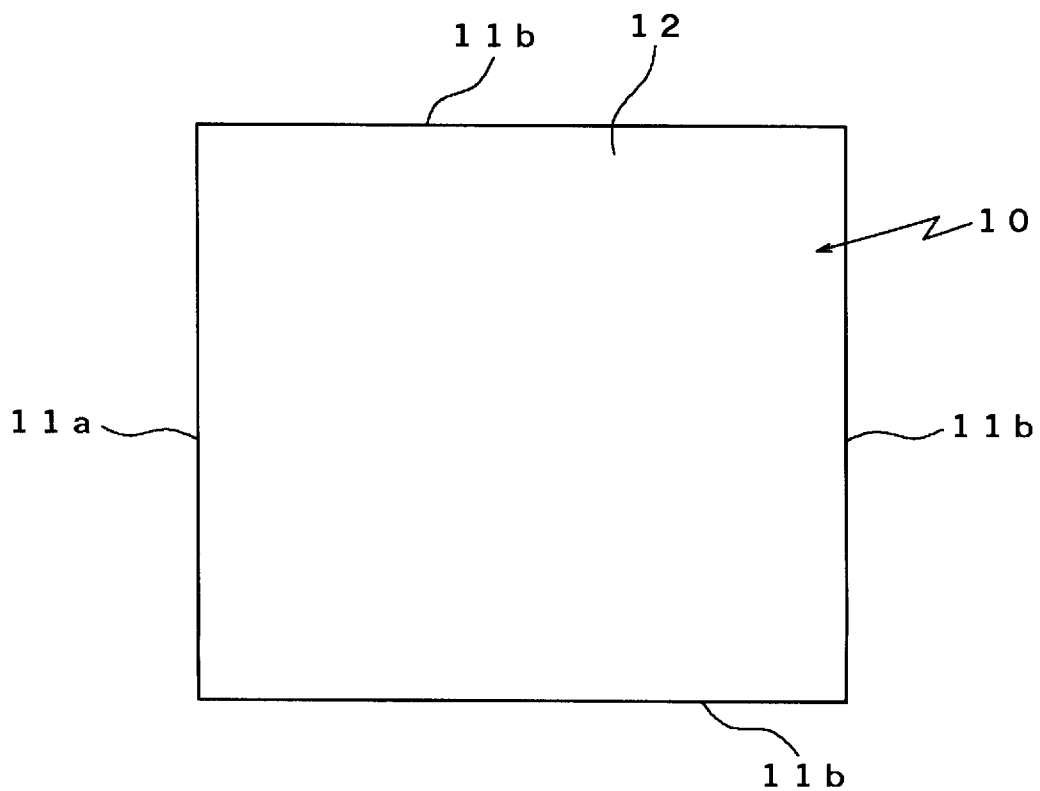

In a panel used for a surface light source device according to an embodiment 3, a transparent substrate 10 is so formed that its plane is in a rectangular shape, and the thickness thereof is decreased away from an end surface 11a to which a light source 1 is provided in close proximity, as shown in FIGS. 9 (A) and 9 (B), using polymethyl methacrylate resin having high light transmission properties.

Figure 10:
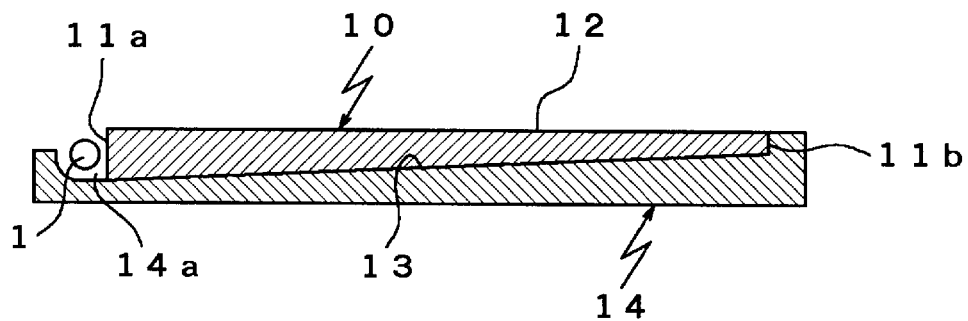
FIG. 10, consisting of FIG. 10A and FIG. 10B, is a schematic cross-sectional view and a plan view showing a state where reflecting members are formed in such a manner as to be in contact with three end surfaces excluding an end surface, to which a light source is provided in close proximity, of a transparent substrate and a reflecting surface in the panel according to the embodiment 3.
Figure 10:
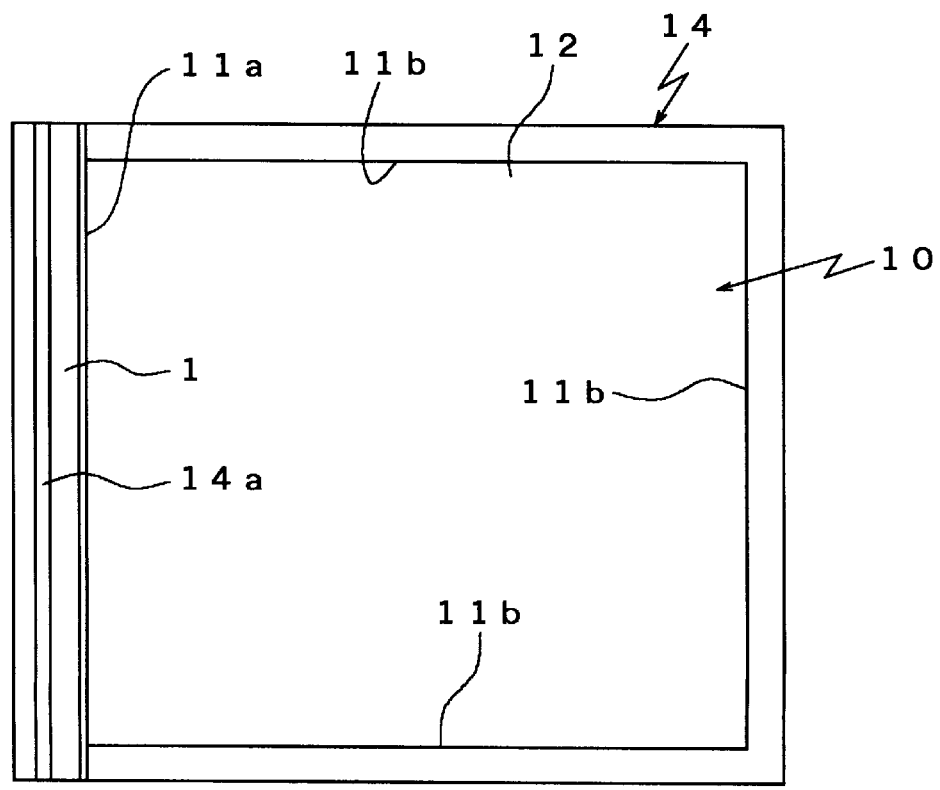

In the panel in the embodiment 3, a reflecting member 14 composed of resin having light reflecting properties is integrally formed in such a manner as to be in contact with three end surfaces 11b other than the end surface 11a which is in close proximity to the light source, and a reflecting surface 13 in the above-mentioned transparent substrate 10, as shown in FIGS. 10(A) and 10(B), and there is provided a containing section 14a containing the light source 1 upon further projecting the reflecting member 14 toward the light source 1 beyond the end surface 11a, which is in close proximity to the light source 1, of the transparent substrate 10.

Examples of the resin having light reflecting properties used for the reflecting member 14 include one whose reflecting properties are increased by adding titanium oxide, zinc sulfide, etc. which is a white pigment to polymethyl methacrylate resin, polycarbonate resin, etc. In a case where the reflecting member 14 is integrally formed in such a manner as to be in contact with the transparent substrate 10 as described above, when the resin used for the reflecting member 14 and the resin used for the transparent substrate 10 differ in the coefficient of thermal expansion or the like, a load is applied to the transparent substrate 10 and the reflecting member 14 by heat or the like at the time of using the panel, whereby the transparent substrate 10 and the reflecting member 14 are deformed. Therefore, it is preferable to use as the resin used for the reflecting member 14 the same resin as the resin used for the transparent substrate 10 or resin similar thereto in properties such as the coefficient of thermal expansion.

Figure 11:
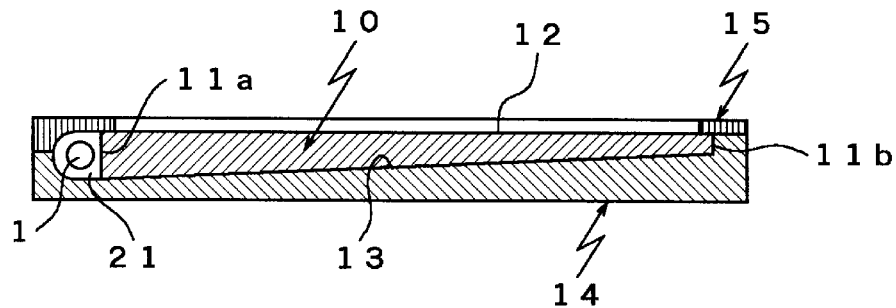
FIG. 11 is a schematic cross-sectional view of a surface light source device using the panel according to the embodiment 3.

The light source 1 such as a cold-cathode tube is contained in the containing section 14a of the reflecting member 14, a peripheral portion of the transparent substrate 10 is pressed by a pressing member 15 in a square annular shape having reflecting properties, and the light source 1 contained in the containing section 14a is enclosed by the pressing member 15, as shown in FIG. 11.

When light is emitted from the light source 1 enclosed by the containing section 14a of the reflecting member 14 and the pressing member 15, the light emitted in various directions from the light source 1 is reflected by the pressing member 15 and the reflecting member 14, is introduced into the end surface 11a of the transparent substrate 10 which is in close proximity to the light source 1, and is efficiently incident on the transparent substrate 10 through the end surface 11a.

Furthermore, the light introduced into the transparent substrate 10 through the end surface 11a is reflected by the reflecting member 14 formed in contact with the three end surfaces 11b excluding the end surface 11a and the reflecting surface 13, and is efficiently introduced into the light emitting surface 12, whereby uniform and bright light is obtained from the entire light emitting surface 12.

In the panel used for a surface light source device in the embodiment 3, the reflecting member 14 is formed in such a manner as to be in contact with the end surfaces 11b other than the end surface 11a which is in close proximity to the light source 1, and the reflecting surface 13 in the transparent substrate 10 as described above, whereby the necessity of performing such laborious work that the reflection sheets 2 are affixed to the end surfaces 11b other than the end surface 11a and the reflecting surface 13 as in the conventional example is eliminated. Further, the possibilities that the affixed reflection sheets 2 are stripped by themselves, and the light introduced into the transparent substrate 10 is not reflected from portions where the reflection sheets 2 are stripped, whereby a dark portion partially occurs as in the conventional example are eliminated. Therefore, uniform light is stably emitted from the whole of the light emitting surface 12 of the transparent substrate 10.

Furthermore, in order to emit uniform light from the whole of the light emitting surface 12 of the transparent substrate 10, in forming the transparent substrate 10, a plurality of rows of irregular reflecting portions 13a for irregularly reflecting light so provided that the farther the irregular reflecting portion 13a is apart from the light source 1, the larger the area thereof is, as shown in FIG. 2, an irregular reflecting portion 13a is formed on the whole of the reflecting surface 13, as shown in FIG. 3, a translucent diffusion sheet 4 is arranged on the light emitting surface 12 so that emitted light is made uniform upon being diffused by the diffusion sheet 4, as in the conventional example. Further, the light emitting surface 12 is further provided with a lens sheet so that emitted light can be gathered in a direction perpendicular to the light emitting surface 12.

Figure 12:
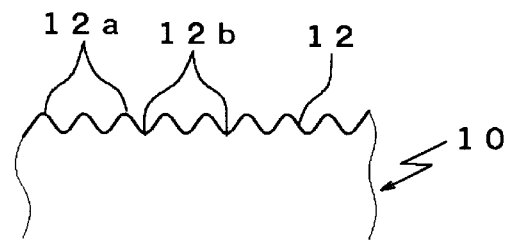
FIG. 12 is a partial illustration showing a state where a lot of projection and recesses in a fine and smooth shape are formed on a light emitting surface of a transparent substrate in the panel according to the embodiment 3.
Figure 13:
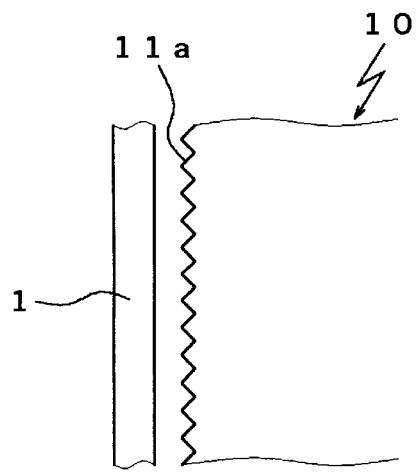
FIG. 13 is a partial illustration showing a state where an end surface, to which a light source is provided in close proximity, of a transparent substrate is formed in a concave-convex shape in the direction of its end side in the panel according to the embodiment 3.

Furthermore, in a case where the irregular reflecting portions 13 for irregularly reflecting light are provided on the reflecting surface 13 of the transparent substrate 10, in order to prevent the irregular reflecting portions 13 from being seen as if the pattern thereof was raised and prevent a difference in brightness from partially arising, a lot of projections 12a and recesses 12b in a fine and smooth shape are provided on the light emitting surface 12 of the transparent substrate 10, as shown in FIG. 12. Further, in order to prevent luminescent lines from being produced along the end surface 11a to which the light source 1 is provided in close proximity in the vicinity of the end surface 11a, the end surface 11a can be also formed in a concavo-convex shape in the direction of its end side, as shown in FIG. 13.

Although the present invention has been described and illustrated in detail, it is clearly understood that the same is by way of illustration and example only and is not to be taken by way of limitation, the spirit and scope of the present invention being restricted only by the terms of the appended claims.

What is claimed is:

1. A panel used for a surface light source device, comprising:

a transparent substrate having high light transmission properties, the transparent substrate having an end surface on which light emitted from a light source is incident, a reflecting surface for reflecting the incident light, and a light emitting surface for emitting the incident light, the end surface on which the light is incident having a plurality of concave-convex sub-surfaces aligned along a length of the end surface, the length of the end surface having a dimension greater than the width of the end surface.

2. The panel according to claim 1, wherein
   the concavo-convex shape of said end surface is a zigzag shape.

3. The panel according to claim 2, wherein
   a point angle of the zigzag on said end surface is in the range of 60 to 150°.

4. The panel according to claim 1, wherein
   a reflecting member composed of resin having light reflecting properties is provided in such a manner as to be in contact with at least two end surfaces of said transparent substrate.

5. The panel according to claim 4, wherein
   said reflecting member is provided in such a manner as to be in contact with the reflecting surface.

6. The panel according to claim 1, wherein
   said reflecting surface is provided with an irregular reflecting portion for irregularly reflecting the light.

7. The panel according to claim 1, wherein
   said reflecting surface is provided with an irregular reflecting portion for irregularly reflecting the light, and said light emitting surface is provided with projections in a fine and smooth shape or recesses in a fine and smooth shape, a derivative of a height or a depth of said fine and smooth shape of said projections or recesses with respect to any direction parallel to said light emitting surface being continuous.

8. A panel used for a surface light source device, comprising:

a transparent substrate having high light transmission properties, the transparent substrate having an end surface on which light emitted from a light source is incident, a reflecting surface for reflecting the incident light, and a light emitting surface for emitting the incident light, said reflecting surface being provided with an irregular reflecting portion for irregularly reflecting the light, said light emitting surface being provided with projections in a fine and smooth shape or recesses in a fine and smooth shape, a derivative of a height or a depth of said fine and smooth shape of said projections or recesses with respect to any direction parallel to said light emitting surface being continuous.

9. A panel used for a surface light source device, comprising:

a transparent substrate having high light transmission properties, the transparent substrate having an end surface on which light emitted from a light source is incident, a reflecting surface for reflecting the incident light, and a light emitting surface for emitting the incident light, a reflecting member composed of resin having light reflecting properties being integrally formed on the transparent substrate in such a manner as to be in contact with at least two end surfaces of said transparent substrate.

10. The panel according to claim 9, wherein
    said reflecting member is integrally formed in such a manner as to be in contact with the reflecting surface of the transparent substrate.

11. The panel according to claim 9, wherein
    the light emitting surface of said transparent substrate is provided with projections in a fine and smooth shape or recesses in a fine and smooth shape.

12. The panel according to claim 9, wherein said reflecting member is in contact with a first end surface of said transparent substrate opposite a second end surface of said transparent substrate on which the light is incident, and said reflecting member is in contact with a third end surface of said transparent substrate interposed between said first and second surfaces of said transparent substrate.

* * * * *